United States Patent [19]

Hafla

[11] Patent Number: 5,067,363
[45] Date of Patent: Nov. 26, 1991

[54] CLEARANCE-FREE SPINDLE DRIVE

[75] Inventor: Dietmar F. Hafla, Hohengehren, Fed. Rep. of Germany

[73] Assignee: Index-Werke GmbH & Co. KG Hahn & Tessky, Fed. Rep. of Germany

[21] Appl. No.: 579,353

[22] Filed: Sep. 5, 1990

[30] Foreign Application Priority Data

Sep. 11, 1989 [DE] Fed. Rep. of Germany ....... 3930334

[51] Int. Cl.⁵ .................................................. F16H 35/08
[52] U.S. Cl. ............................................. 74/392; 74/397; 74/409; 74/440
[58] Field of Search .................. 74/392, 397, 409, 440, 74/462

[56] References Cited

U.S. PATENT DOCUMENTS

| | | | |
|---|---|---|---|
| 1,226,559 | 5/1917 | Mason | 74/397 X |
| 3,399,582 | 9/1968 | Henry | 74/397 X |
| 4,292,857 | 10/1981 | Matusz | 74/409 X |
| 4,524,643 | 6/1985 | Ziegler et al. | 74/409 X |
| 4,532,822 | 8/1985 | Godlewski | 74/397 |

FOREIGN PATENT DOCUMENTS 3438309 11/1985 Fed. Rep. of Germany .

Primary Examiner—Dirk Wright
Attorney, Agent, or Firm—Neuman, Williams, Anderson & Olson

[57] ABSTRACT

In order to improve a spindle drive for machine tools, comprising a housing, a spindle mounted in the housing, a drive motor arranged on the housing and a gear arranged in the housing and comprising an intermediate shaft driven by the drive motor and mounted in the housing via two shaft bearings spaced from one another as well as a first gear wheel seated on the intermediate shaft, wherein for driving the spindle as C-axis the first gear wheel engages in a first position with a second gear wheel driving the spindle so as to mesh with the second gear wheel without clearance, such that it is more simple in construction it is suggested that the first shaft bearing fix the intermediate shaft immovably on the housing in a direction transverse to its axis and that the intermediate shaft be adapted to be moved back and forth by the second shaft bearing relative to the second gear wheel in an adjusting direction between the first position and a second position, the gear wheels meshing with one another in the second position with clearance.

22 Claims, 7 Drawing Sheets

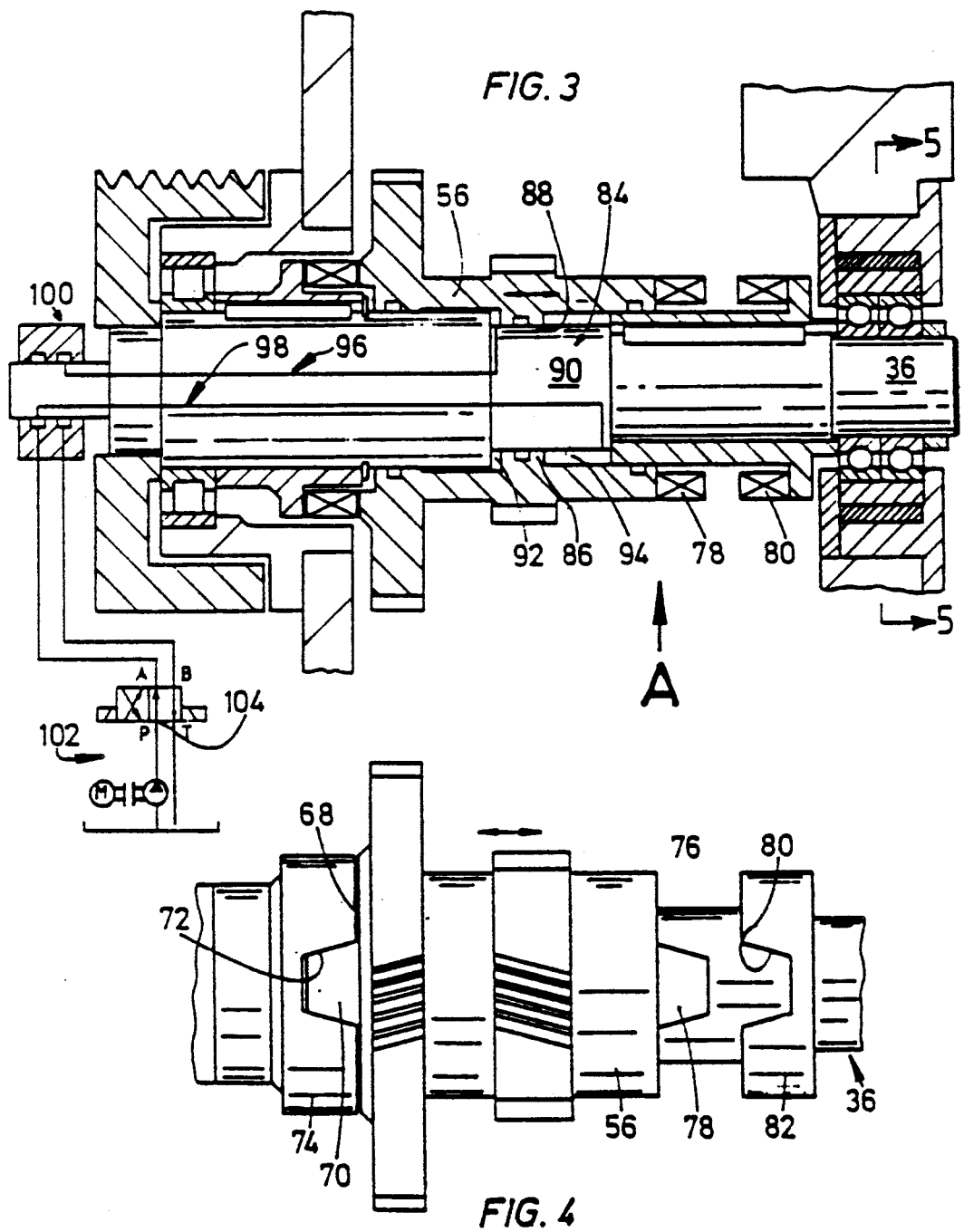

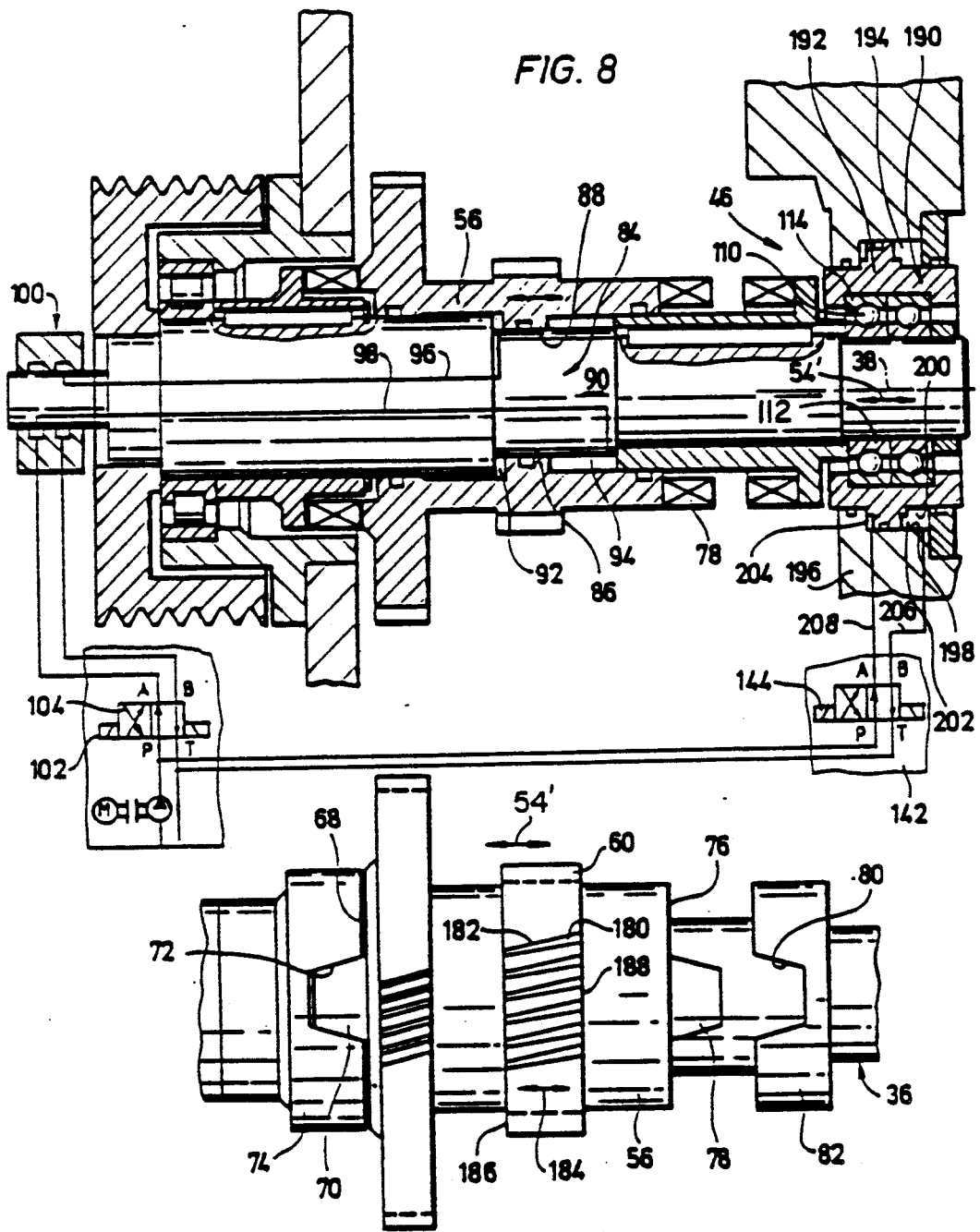

CLEARANCE-FREE SPINDLE DRIVE

The invention relates to a spindle drive for machine tools, in particular for lathes, comprising a housing, a spindle mounted in the housing, a drive motor arranged on the housing and a gear means arranged in the housing, this gear comprising an intermediate shaft driven by the drive motor and mounted in the housing via two shaft bearings spaced from one another as well as a first gear wheel seated on the intermediate shaft, wherein for driving the spindle as C-axis the first gear wheel engages in a first position with a second gear wheel driving the spindle so as to mesh with the second gear wheel without clearance.

A spindle drive of this type is known from DE-PS 34 38 309. For the purpose of driving the spindle without clearance in this spindle drive, an intermediate gear wheel is moved between a gear wheel on the driven side and a gear wheel on the driving side and held in engagement with these two gear wheels so as to result in a clearance-free drive of the gear wheel on the driven side. In a rotary drive without a C-axis control additional gear steps are used and the intermediate gear wheel is completely disengaged from the other two gear wheels.

The disadvantage of this solution is that an additional clearance-free gear step must be arranged for connection with the gear steps present for normal rotary drive.

The object underlying the invention is therefore to improve a spindle drive of this generic type such that it is more simple in construction.

This object is accomplished according to the invention for a spindle drive of the type described at the outset in that the first shaft bearing fixes the intermediate shaft immovably on the housing in a direction transverse to its axis and that the intermediate shaft is adapted to be moved back and forth by the second shaft bearing relative to the second gear wheel in an adjusting direction between the first position and a second position, the gear wheels meshing with one another in the second position with clearance.

The advantage of the inventive solution is to be seen in the fact that one and the same gear step can be used for C-axis drive and for normal rotary operation since one and the same gear step can be switched from a state without clearance into a state with clearance. From a constructional point of view, this is easy to accomplish in accordance with the invention in that the intermediate shaft can be moved back and forth by the second bearing relative to the spindle and, therefore, relative to the housing, as well, in an adjusting direction between the first and second positions in order to switch the gear step formed by the first gear wheel and the second gear wheel into a state without clearance, on the one hand, and, on the other hand, into a state with clearance.

In this respect it is particularly advantageous for the second shaft bearing to comprise a pivot bearing receiving the intermediate shaft and an adjusting member moving the pivot bearing in adjusting direction. This provides the possibility of moving the intermediate shaft in the adjusting direction not in a rotating system but in a resting or non-rotation system.

A particularly space-saving solution is possible due to the adjusting member embracing the pivot bearing.

In the simplest case, the inventive solution may be realized in that the adjusting member comprises a support member for the pivot bearing which is movable in the adjusting direction.

In addition, it is advantageous in one embodiment for the adjusting member to comprise an eccentric member rotatable in a bearing member. Preferably, the eccentric member is actuated by a hydraulic piston which rotates this eccentric member.

A simple constructional embodiment of the invention is realized when the support member forms the eccentric member which then receives the pivot bearing.

In the embodiments described so far nothing has been said concerning the most appropriate way of actuating the adjusting member. Preferably, this is accomplished in that the adjusting member comprises a piston chamber and a piston arranged therein.

In this connection, a particularly simple solution, from a constructional point of view, is one in which the support member forms the piston which is acted upon by pressure and, therefore, preferably separates two pressure chambers in the piston chamber from one another, these two chambers being acted upon by pressure.

No details have so far been given within the scope of the present invention with respect to the adjusting direction. In an advantageous embodiment, the adjusting direction extends transversely to the axis of the intermediate shaft. In this case, the intermediate shaft and, with it, the first gear wheel are displaced towards the spindle and therefore towards the second gear wheel so that the two gear wheels are pressed into engagement with their teeth.

Particularly short paths of displacement are required when the adjusting direction extends substantially radially to the axis of rotation of the second gear wheel so that the first and second gear wheels engage with one another to a greater extent due to a slight adjusting movement.

In all the aforesaid cases, in which the adjusting direction extends transversely to the axis of the intermediate shaft, the first and second gear wheels are, insofar as these are spur wheels, provided with conventional teeth which are merely brought into engagement with one another to a greater or lesser extent due to the movement of the intermediate shaft in the adjusting direction so that they mesh without clearance or with clearance.

Alternatively, it is also conceivable for the adjusting direction to extend parallel to the axis of the intermediate shaft. In this case, when spur wheels are used as first and second gear wheels, at least one of the sets of teeth has teeth which are formed in a transverse direction in the shape of a wedge so that the teeth mesh with one another either without clearance or with clearance, depending on how far the first and second gear wheels are moved over one another.

No details have yet been given, in the embodiments described thus far, concerning the design of the intermediate shaft. In one case, it is advantageous for the intermediate shaft to be a hollow shaft.

In this case it is expedient for the intermediate shaft to be seated on a drive shaft.

In particular in order to render additional transmissions possible when driving the spindle, the intermediate shaft is displaceable on the drive shaft in the direction of its axis between first and second switching positions.

Moreover, in order to locate the intermediate shaft in a defined manner in these switching positions it is expedient for the intermediate shaft to be adapted to be fixed in position, in particular by stop means, on the drive shaft so as to be immovable in the direction of its axis.

With respect to driving the intermediate shaft via the drive shaft the most varied possibilities are conceivable. In a particularly simple solution from a constructional point of view, the intermediate shaft is adapted to be connected with the drive shaft in the switching positions by way of wedge-shaped teeth. These wedge-shaped teeth can, in particular, be brought into engagement without clearance so that a clearance-free transmission of torque from the drive shaft to the intermediate shaft results.

Preferably, this construction may be realized in the most simple manner by providing the intermediate shaft at its opposed end faces with wedge-shaped teeth which can be brought into engagement with corresponding, facing wedge-shaped teeth of the drive shaft in the first and second switching positions, respectively, and may preferably be kept in engagement without clearance due to the intermediate shaft being acted upon in the direction of its axis.

The second gear step is preferably realized in that the intermediate shaft bears a third gear wheel which can be brought into engagement with a fourth gear wheel, which drives the spindle, alternatively to the first and second gear wheels.

In the embodiments described so far nothing has been said about how the intermediate shaft is mounted in the housing by way of the first and second shaft bearings, i.e. whether the intermediate shaft is mounted directly, i.e. itself, with the first and second shaft bearings or indirectly. When a drive shaft is used, it is expedient for the drive shaft to be mounted in the housing with the first and second shaft bearings and for the movement of the second shaft bearing in the adjusting direction to be transmitted from the drive shaft to the intermediate shaft.

In a constructionally simple and advantageous solution, the drive shaft extends through the first and second shaft bearings.

Additional features and advantages of the invention are the subject of the following description as well as the drawings of several embodiments. In these drawings, FIG. 1 is a schematic, perspective view of an inventive spindle drive;

FIG. 3 is an enlarged illustration of an intermediate shaft and a drive shaft comprising a control means for individual switching positions of the intermediate shaft;

FIG. 4 is a plan view of the intermediate shaft and the drive shaft seen in the direction of arrow A in FIG. 3;

FIG. 8 shows a section similar to FIG. 3 through a second embodiment and

FIG. 9 is a plan view similar to FIG. 4 of the intermediate shaft and the drive shaft of the second embodiment.

Figure 1:
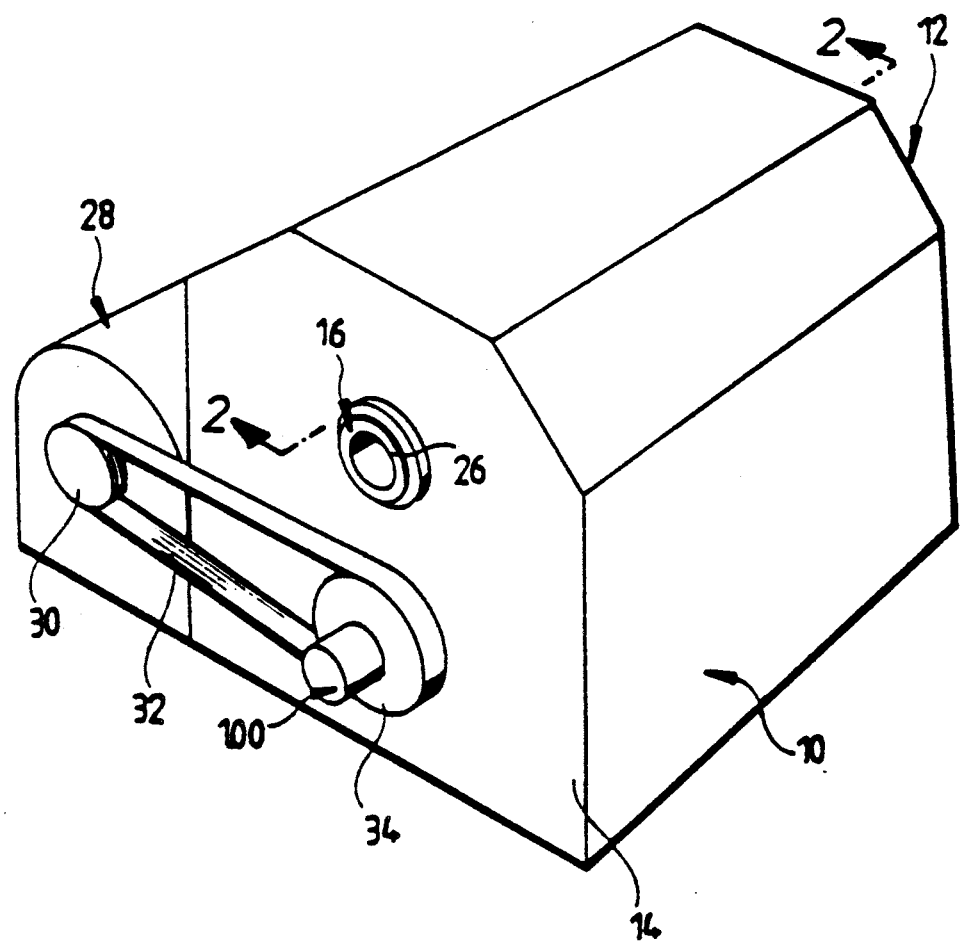
Figure 2:
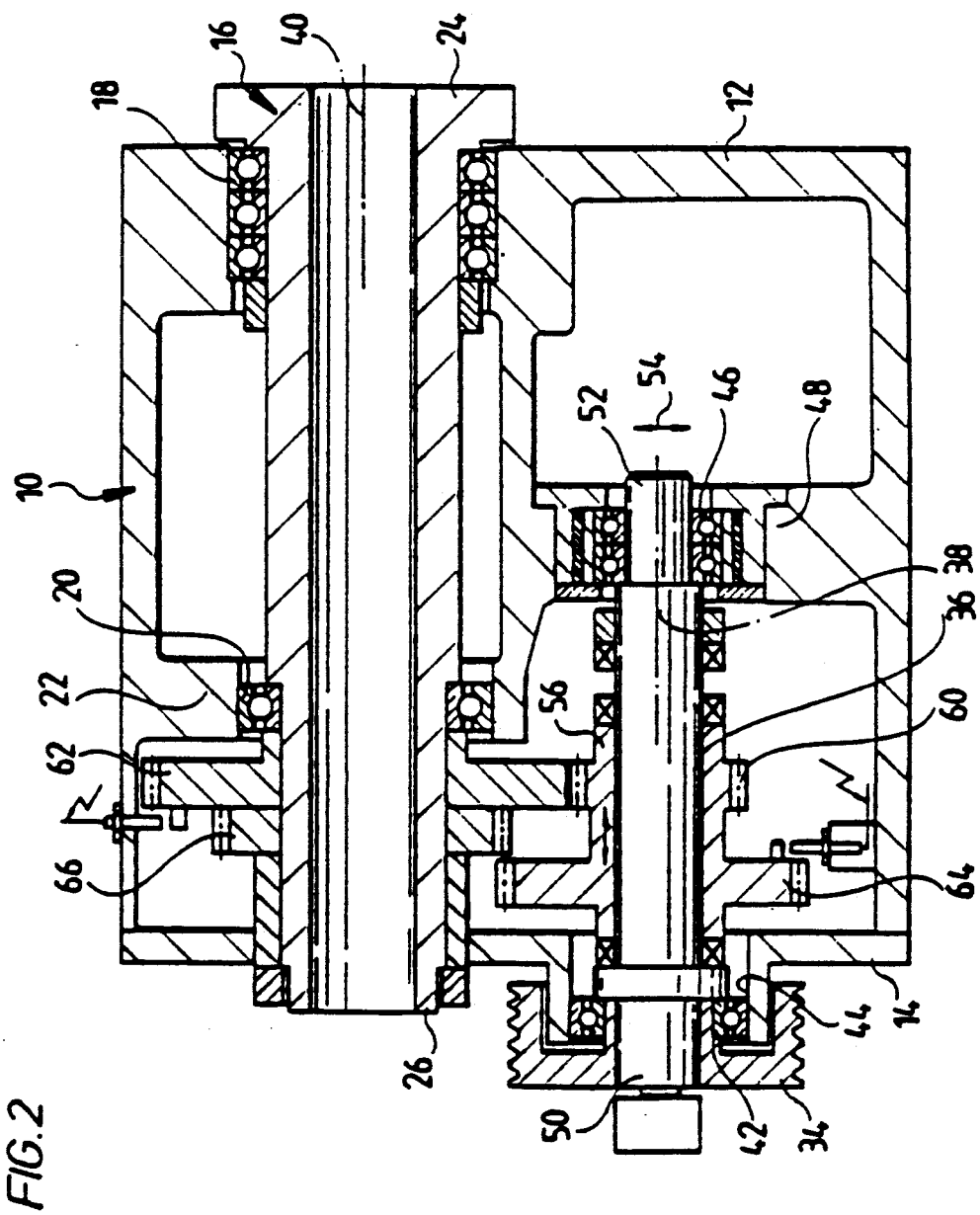
FIG. 2 shows a section along line 2—2 in FIG. 1.

A first embodiment of an inventive spindle drive, schematically illustrated in FIG. 1, comprises a housing designated as a whole as 10. This housing, as illustrated in FIG. 2, comprises a front wall 12 and a rear wall 14. A spindle designated as a whole as 16 is mounted in this housing 10 for rotation, by way of a front spindle bearing 18 held by the front wall 12 and a rear spindle bearing 20 which is borne by a central web 22 of the housing 10 arranged between the front wall and the rear wall 14.

The spindle 16 extends through the entire housing 10 and projects with a spindle nose 24 beyond the front wall and with a spindle end 26 beyond the rear wall 14.

A drive motor designated as a whole as 28 is arranged on the housing 10 for driving the spindle 16. This drive motor drives a belt pulley 34 projecting beyond the rear wall 14 via a belt pulley 30 and a drive belt 32 extending parallel to and behind the rear wall 14. The belt pulley 34 is firmly seated on a drive shaft 36 extending with its axis 38 parallel to the spindle axis 40 in the housing 10.

The drive shaft 36 is mounted by way of a first shaft bearing 42 which is accommodated in a bearing recess 44 of the rear wall 14 and a second shaft bearing 46 which is seated in a support web 48 of the housing 10 located between the rear wall 14 and the front wall 12.

The drive shaft 36 penetrates the first shaft bearing 42 with its rear end 50 bearing the belt pulley 34 and the second shaft bearing 46 with its front end 52.

The first shaft bearing 42 is designed such that it holds the rear end 50 of the drive shaft in a fixed position in the housing 10 in all directions transverse to its axis 38 whereas the second shaft bearing 46 is designed such that the front end 52 is movable towards and away from the spindle 16 in an adjusting direction 54 which extends at right angles to the axis 38 and is located in a plane defined by the axis 38 and the spindle axis 40.

The drive shaft 36 penetrates an intermediate shaft 56 which is formed as a hollow shaft and arranged between the first shaft bearing 42 and the second shaft bearing 46. The intermediate shaft 56 is displaceable on the drive shaft 36 in the direction of the axis 38 between a first switching position illustrated in FIGS. 2, 3 and 4 and a second switching position, the intermediate shaft 56 being non-rotatably connected with the drive shaft 36 in both switching positions.

In the first switching position a first gear wheel 60 which is non-rotatably seated on the intermediate shaft 56 meshes with a second gear wheel 62 which is non-rotatably seated on the spindle 16 between the rear spindle bearing 20 and the spindle end 26. This means that in the first switching position the drive shaft 36, which is driven by the drive motor 28 via the belt pulleys 30 and 34 and the drive belt 32, and the intermediate shaft 56 of the spindle 16, which is non-rotatably connected with the drive shaft, as well as spindle 16 are driven via the drive motor 28.

In the first switching position the first gear wheel 60 and the second gear wheel 62 are, preferably, designed as reduction gears so that the spindle 16 is driven at a slow speed.

In the second switching position, the intermediate shaft 56 is displaced in the direction of the second shaft bearing 46 to such an extent that a third gear wheel 64, which is non-rotatably seated on the intermediate shaft 56 at a distance behind the first gear wheel 60, can be brought into engagement with a fourth gear wheel 66 which is seated directly behind the second gear wheel 62 and the first gear wheel 60 and the second gear wheel 62 are thereby disengaged. Preferably, the speed is not reduced during drive via the third gear wheel 64 and the fourth gear wheel 66; transmission is approximately 1:1.

The non-rotatable connection between the drive shaft 36 and the intermediate shaft 56 is illustrated in detail in FIGS. 3 and 4. As shown in these drawings, the intermediate shaft 56 is provided at its end face 68 facing the first shaft bearing 42 with a wedge-shaped first cam 70 protruding beyond this end face 68. This cam can, in the first switching position, be brought into engagement with a corresponding first recess 72 of a first ring 74 non-rotatably seated on the drive shaft 36.

Similarly, a second wedge-shaped cam 78 is provided on the end face 76 of the intermediate shaft 56 which is opposite the end face 68 and therefore faces the second shaft bearing 46. This cam can, in the second switching position, be brought into engagement with a second wedge-shaped recess 80 in a second ring 82 which is also non-rotatably seated on the drive shaft 36.

The non-rotatable connection via the cams 70 and 78 and the recesses 72 and 80, respectively, is without clearance in both switching positions due to the wedge-shaped design.

In order to displace the intermediate shaft 56 on the drive shaft 36, the drive shaft 36 is, as illustrated in FIG. 3, provided with a recess 84 forming a piston chamber. An annular flange 86 of the intermediate shaft 56 extends into this recess and, with a curved face 88, abuts sealingly on a groove base 90 of the recess 84 so that pressure chambers 92 and 94 are formed on either side of the annular flange 86 in the annular groove. Each of these pressure chambers has a hydraulic line 96 and 98, respectively, opening into it. These lines penetrate the drive shaft 36 and lead to a hydraulic control means 102 via a rotary connection 100 projecting beyond the rear end 50 of the drive shaft 36. This control means comprises a control valve 104 for subjecting either the pressure chamber 92 or the pressure chamber 94 to pressurized hydraulic medium so that when the pressure chamber 94 has hydraulic medium acting on it the intermediate shaft 56 is in the first switching position whereas when the pressure chamber 92 has hydraulic medium acting on it the intermediate shaft 56 is in the second switching position.

Figure 5:
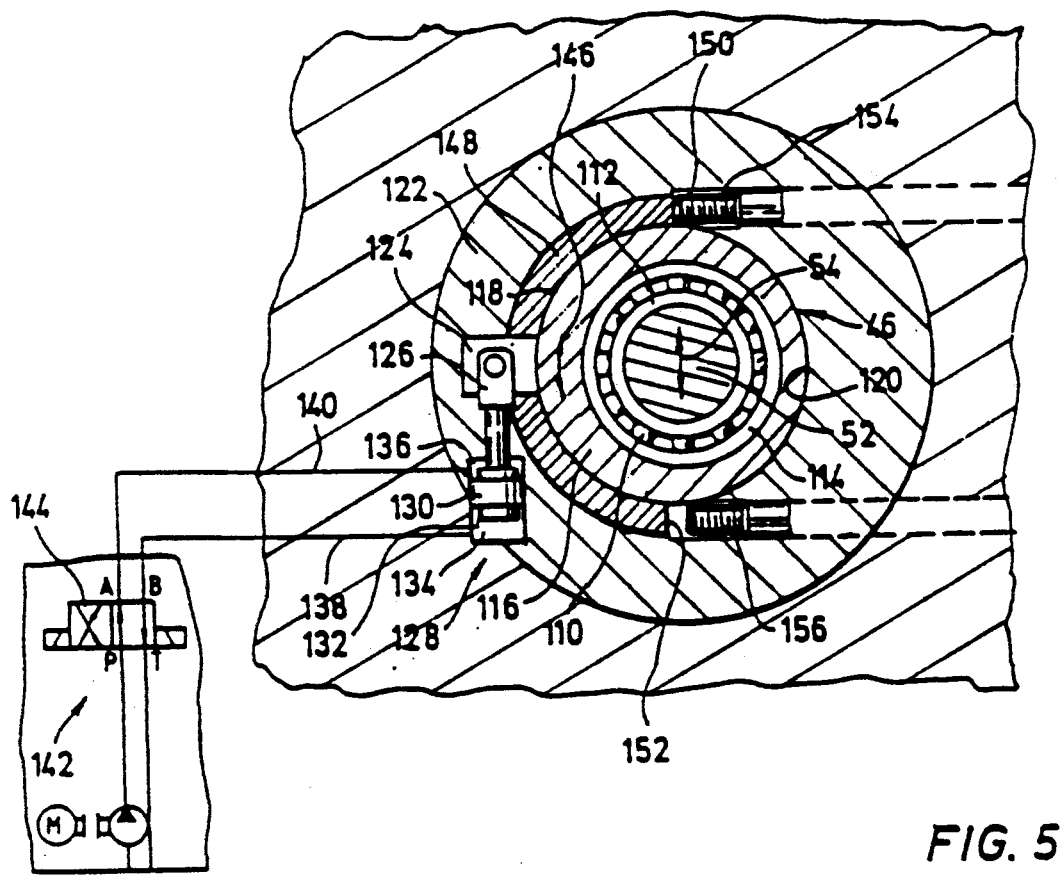
FIG. 5 shows a section along line 5—5 in FIG. 3.

The second shaft bearing 46 comprises, as shown in FIG. 5 on an enlarged scale, a pivot bearing 110 having an inner bearing ring 112 in which the front end 52 of the drive shaft 36 is seated and which is rotatable relative to an outer bearing ring 114 by rolling members. This outer bearing ring 114 is held by an eccentric ring 116 and arranged eccentrically to a cylindrical outer surface 118 of this eccentric ring 116. At this outer surface 118 the eccentric ring is seated in a circular receiving means 120 of an outer bearing bushing 122 non-rotatably mounted in the support web 48. An adjusting lever 124 projects from the eccentric ring 116 in the radial direction thereof and this lever is acted upon by a piston rod 126 of a hydraulic cylinder designated as a whole as 128. This piston rod extends approximately tangentially to the eccentric ring 116. The hydraulic cylinder comprises a hydraulic piston 130 which separates two pressure chambers 134 and 136 from one another in a piston chamber 132. Two hydraulic lines 138 and 140 lead to each of these pressure chambers 134 and 136 and are led to a control unit 142 which comprises a control valve 144 with which the pressure chambers 134 and 136 are acted upon alternatingly. Due to movement of the piston 130, the eccentric ring 116 is rotated in the direction of arrow 146 and due to the eccentric mounting of the pivot bearing 110 in this ring the front end 52 of the drive shaft 36 is displaceable in the adjusting direction 54 towards and away from the spindle axis 40.

In this way, the entire drive shaft 36 is slightly tilted about a tilt axis located in the first shaft bearing 42. As a result of the drive shaft 36 being tilted towards or away from the spindle axis 40 the intermediate shaft 56 is, at the same time, tilted accordingly and therefore the first gear wheel 60 is brought into engagement to a greater or lesser extent with the second gear wheel 62 so that the two gear wheels mesh with one another either without clearance or with clearance.

As soon as the first and second gear wheels 60, 62 mesh with one another without clearance an overall clearance-free drive of the spindle 16, preferably for controlling the same as C-axis, is possible by way of the drive motor 28. This drive is very slow and so the wear and tear on the first and second gear wheels 60, 62 is slight. This position of the intermediate shaft 56 is designated as the first position. If the spindle 16 is, however, to be driven without a controlled C-axis, the front end 52 is moved away from the spindle axis 40 in the adjusting direction 54 and the drive shaft 36 is tilted, as a whole, away from the spindle axis 40 so that the first and second gear wheels 60, 62 merely engage in one another with clearance and so higher rotational speeds are possible and with slight wear and tear. This position is designated as the second position of the intermediate shaft 56.

In order to be able to define the first and second positions exactly, an annular cam member 148 is provided in addition on the eccentric ring 116. This member is seated on the outer surface 118 of the eccentric ring and has the shape of a semicircular ring with two end faces 150 and 152 located on opposite sides and extending radially to the axis of rotation of the eccentric ring 116. When the eccentric ring 116 is rotated in the direction of arrow 146, either the end face 150 or the end face 152 is moved each time against a setscrew 154, 156, respectively, as stop member. In the first position, the end face 152 abuts on the setscrew 156 whereas in the second position the end face 150 abuts on the setscrew 154.

Figure 6:
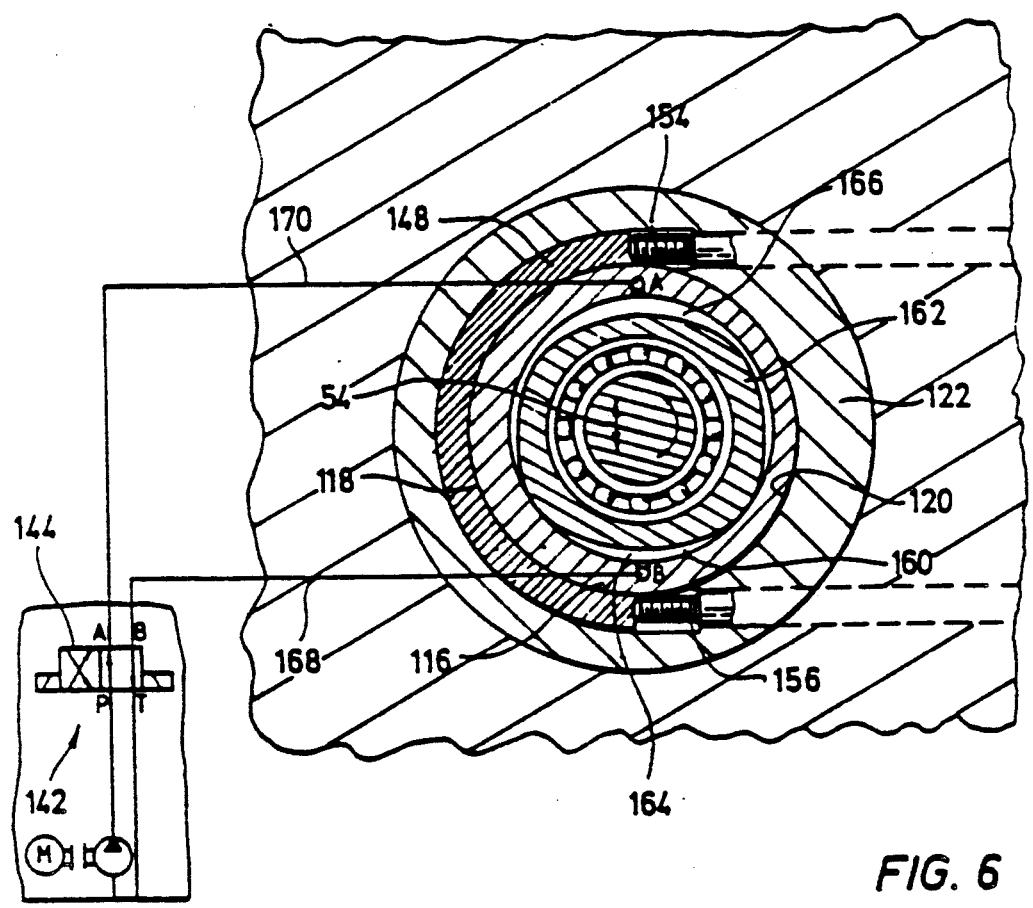
FIG. 6 is a view similar to FIG. 5 of a first variation.

In a variation of the first embodiment, illustrated in FIG. 6, the bearing bushing 122 is also provided with the receiving means 120 in which the eccentric ring 116 is located with its outer surface 118. In addition, an annular cam member 148 having two end faces 150 and 152 is likewise provided. In contrast to the first embodiment, the eccentric ring 116 of this variation is no longer hydraulically rotated in the direction of arrow 146 but held in a defined position by the two setscrews 154, and 156 and adjusted by rotation of the setscrews 154, 156 to a predetermined position.

For movement of the front end 52 in the adjusting direction 54, the eccentric ring 116 is provided with a circular piston chamber 160 in which a piston 162 in the form of a circular ring provided with four flat surface portions is movably arranged. The piston 162 is displaceable in the piston chamber 160 in the adjusting direction 54 and thereby divides the piston chamber 160 into a first pressure chamber 164 and a second pressure chamber 166.

A first hydraulic line 168 opens into the first pressure chamber 164 and a second hydraulic line 170 into the second pressure chamber 166. These lines are both led to the control unit 142 which, for its part, causes pressurized hydraulic medium to act on either one or other of the two pressure chambers 164 and 166, respectively, by means of the control valve 144 so that the piston is displaceable back and forth in the adjusting direction 54 between piston positions corresponding to the first and second positions in the vicinity of the intermediate shaft 56.

Moreover, the first variation according to FIG. 6 is constructed in the same manner as that described in conjunction with the first embodiment. For this reason, the same reference numerals have been used for the same parts and with respect to the remaining parts reference can be made to the comments on the first embodiment.

Figure 7:
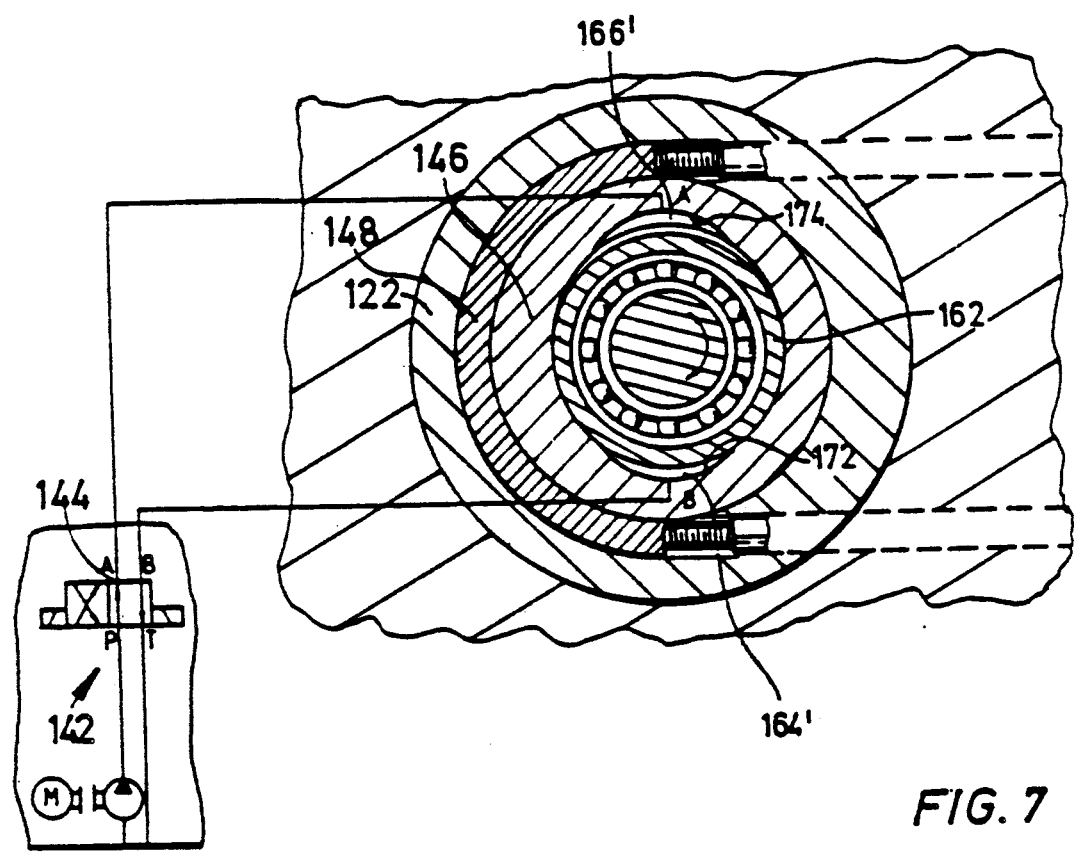
FIG. 7 is a view similar to FIG. 5 of a second variation.

A second variation of the first embodiment, illustrated in FIG. 7, represents a modification of the first variation, illustrated in FIG. 6. In contrast to the first variation, the piston 162 is also circular in design. However, the piston chamber 160 is provided, in addition and deviating from the circular shape, with pressure pockets 172 and 174 which bestow on the chamber a partially oval shape and contribute to formation of the first pressure chamber 164' and the second pressure chamber 166', respectively. The hydraulic lines 168 and 170 then open into these pressure pockets 172 and 174 and so the second variation operates in the same manner as the first variation. In this respect, reference is therefore made in full to the comments on the first variation.

Moreover, the second variation is of identical construction to the first variation as far as the remaining parts are concerned and so with respect to their description reference can be made to the drawings and specification relating to the first embodiment.

In a second embodiment, illustrated in FIGS. 8 and 9, the same reference numerals have been used insofar as the same parts have been used. Regarding the description of these parts reference can again be made to the comments and drawings relating to the first embodiment.

In contrast to the first embodiment, the second shaft bearing 46 is designed such that the adjusting direction 54' extends parallel to the axis 38 of the drive shaft 36.

In order to bring about, in the same way as in the first embodiment, meshing of the first gear wheel 60 with the second gear wheel 62 in the first position of the intermediate shaft 56 without clearance and meshing in the second position of the intermediate shaft 56 with clearance, individual teeth 180 of the first gear wheel 60 are designed such that their flanks 182 extend in a transverse direction 184, i.e. from a first end face 186 to a second end face 188 facing the second shaft bearing 46, in a wedge shape and the dimension between them widens in the direction from the first end face 186 towards the second end face 188 i.e. the tooth width increases and the intertooth space decreases from the first end face 186 towards the second end face 188. If the teeth of the second gear wheel 62 engage in a region of the tooth flanks 182 adjacent the first end face 186, the first gear wheel 60 and the second gear wheel mesh with clearance. If, however, the first gear wheel is displaced in the direction of the first shaft bearing 42, the teeth of the second gear wheel 62 engage in a region of the tooth flanks 182 adjacent the second end face 188 and so the first gear wheel 60 and the second gear wheel 62 now mesh without clearance. The clearance-free meshing of the first gear wheel 60 with the second gear wheel 62 takes place in the first position of the intermediate shaft while the meshing with clearance takes place in the second position of the intermediate shaft 56.

To switch the intermediate shaft 56 over from the first into the second position, and vice versa, the second shaft bearing 46 is designed such that the front end 52 of the drive shaft 36 is displaceable in the direction of its axis 38.

The second shaft bearing 46 comprises the pivot bearing 110 with the inner bearing ring 112, in which the front end 52 is seated, and the outer bearing ring 114 which is received in a corresponding recess of a sliding sleeve 190.

This sliding sleeve 190 has an annular flange 192 projecting radially outwards. This flange engages in an annular groove 194 of a bearing block designated as a whole as 196 and abuts sealingly on the bottom 198 of this groove.

This annular flange 192 divides a piston chamber 200 formed by the annular groove 194 into a front pressure chamber 202 and a rear pressure chamber 204. Each of these chambers is connected to a hydraulic line 206 and 208, respectively, leading to the control unit 142 so that, once again, either the rear pressure chamber 204 or the front pressure chamber 202 can be acted upon by pressurized hydraulic medium by way of the control valve 144.

When the front pressure chamber 202 is acted upon, the annular flange 192 is moved in the direction of the first shaft bearing 42 and thereby displaces the end 52 of the drive shaft 36 and, therefore, the, entire drive shaft 36 in the direction of its axis 38 and thus also in the adjusting direction 54' so that the intermediate shaft 56 fixed on shaft 36 in the first switching position is located with the first gear wheel 60 in the first position.

If, on the other hand, the rear pressure chamber 204 is acted upon by pressurized hydraulic medium, the drive shaft 36 is moved away from the first shaft bearing 42 in the direction of the second shaft bearing 46 and, with it, the intermediate shaft 56. This means that the intermediate shaft is located with the first gear wheel 60 in the second position, in which the first gear wheel 60 and the second gear wheel 62 mesh with clearance.

The present disclosure relates to the subject matter disclosed in German application No. P39 30 334.9-14 of Sept. 11, 1989, the entire specification of which is incorporated herein by reference.

What is claimed is:

1. A spindle drive for machine tools, comprising a housing, a spindle mounted in said housing, a drive motor arranged on said housing and a gear arranged in said housing and comprising an intermediate shaft driven by said drive motor and mounted in said housing via two shaft bearings spaced from one another as well as a first gear wheel seated on said intermediate shaft, wherein for driving said spindle as C-axis said first gear wheel engages in a first position with a second gear wheel driving said spindle so as to mesh with said second gear wheel without clearance, characterized in that said first shaft bearing (42) fixes one position of said intermediate shaft (56) immovably on said housing (10) in a direction transverse to its axis (38) and that said intermediate shaft (56) is adapted to be moved back and forth by said second shaft bearing (46) relative to said second gear wheel (62) in an adjusting direction (54, 54') between said first position and a second position, the gear wheels (60, 62) meshing with one another in said second position with clearance.

2. Spindle drive as defined in claim 1, characterized in that said second shaft bearing (46) comprises a pivot bearing (110) receiving said intermediate shaft (56) and an adjusting member (116; 160, 162; 192, 194) moving said pivot bearing (110) in adjusting direction (54, 54').

3. Spindle drive as defined in claim 2, characterized in that said adjusting member (116; 160, 162; 192, 194) embraces said pivot bearing (110).

4. Spindle drive as defined in claim 2, characterized in that said adjusting member comprises a support member (116, 160, 162, 190) for said pivot bearing (110) which is movable in said adjusting direction (54, 54').

5. Spindle drive as defined in claim 2, characterized in that said adjusting member comprises an eccentric member (116) rotatable in a bearing member (122).

6. Spindle drive as defined in claim 5, characterized in that said eccentric member (116) is rotatable by a hydraulic cylinder (128).

7. Spindle drive as defined in claim 2, characterized in that said adjusting member comprises a piston chamber (160, 194) and a piston (162, 192) arranged therein.

8. Spindle drive as defined in claim 7, characterized in that said support member (162, 190) forms said piston (162, 192) adapted to be acted on by pressure.

9. Spindle drive as defined in claim 1, characterized in that said adjusting direction (54) extends transversely to the axis (38) of said intermediate shaft (56).

10. Spindle drive as defined in claim 9, characterized in that said adjusting direction (54) extends substantially radially to the axis of rotation (40) of said second gear wheel (62).

11. Spindle drive as defined in claim 1, characterized in that said adjusting direction (54') extends in the direction of said axis (38) of said intermediate shaft (56).

12. Spindle drive as defined in claim 11, characterized in that one of said gear wheels (60, 62) comprises teeth (180) which are wedge-shaped in their transverse direction (184).

13. Spindle drive as defined in claim 1, characterized in that said intermediate shaft (56) is a hollow shaft.

14. Spindle drive as defined in claim 13, characterized in that said intermediate shaft (56) is seated on a drive shaft (36).

15. Spindle drive as defined in claim 14, characterized in that said intermediate shaft (56) is displaceable on said drive shaft (36) in the direction of its axis (38) between a first and a second switching position.

16. Spindle drive as defined in claim 14, characterized in that said intermediate shaft (56) is adapted to be fixed on said drive shaft (36) so as to be immovable in the direction of its axis (38).

17. Spindle drive as defined in claim 15, characterized in that said intermediate shaft (56) is adapted to be connected to said drive shaft (36) in said switching positions by way of wedge-shaped teeth (70, 72; 78, 80).

18. Spindle drive as defined in claim 17, characterized in that said wedge-shaped teeth (70, 72; 78, 80) are adapted to be brought into engagement without clearance.

19. Spindle drive as defined in claim 17, characterized in that said intermediate shaft (56) is provided with wedge-shaped teeth (70, 78) transversely on opposite end faces (68, 76), said wedge-shaped teeth being adapted to be brought into engagement with corresponding, facing wedge-shaped teeth (72, 80) of said drive shaft (36) in said first and said second switching positions, respectively.

20. Spindle drive as defined in claim 1, characterized in that said intermediate shaft (56) bears a third gear wheel (64) adapted to be brought into engagement with a fourth gear wheel (66) driving said spindle (16), alternatively to said first and said second gear wheels (60, 62).

21. Spindle drive as defined in claim 14, characterized in that said drive shaft (36) is mounted in said housing (10) with said first and said second shaft bearings (42, 46).

22. A spindle drive for machine tools, comprising: a housing, a spindle mounted in said housing, a gear in driving relation with said spindle, a drive motor, gear means comprising a shaft driven by said drive motor and mounted in said housing, first and second shaft bearings spaced from one another and supporting said shaft, and a gear wheel seated on said shaft for driving said gear to rotate said spindle when said gear wheel engages in a first position with said gear, said first shaft bearing securing one portion of said shaft against movement in a direction transverse to its axis, said second shaft bearing including a portion engaging said shaft and which is movable relative to said gear to move at least the engaged portion of said shaft in an adjusting direction between a first position wherein said gear wheel meshes with said gear without clearance therebetween and a second position in which said gear and said gear wheel mesh with one another with clearance therebetween, and means for moving said bearing portion to selectively effect movement of the portion of said shaft engaged thereby in said adjusting direction between said first position and said second position.

* * * * *